United States Patent [19]
Furuhashi et al.

[11] Patent Number: 5,251,833
[45] Date of Patent: Oct. 12, 1993

[54] METHOD OF WINDING ARMATURE OF ELECTRIC ROTATING MACHINE

[75] Inventors: Yoshiyuki Furuhashi; Toshiyuki Masuda, both of Toyohashi, Japan

[73] Assignee: ASMO Co., Ltd., Kosai, Japan

[21] Appl. No.: 787,889

[22] Filed: Nov. 5, 1991

[30] Foreign Application Priority Data

Nov. 8, 1990 [JP] Japan ................... 2-301093

[51] Int. Cl.⁵ .......................................... H02K 15/09
[52] U.S. Cl. ..................... 242/7.03; 29/596; 242/1.1 R
[58] Field of Search ............ 29/605, 596; 242/7.03, 242/1.1 R, 5, 7.09, 7.12, 7.07; 310/179, 184, 195, 198, 200

[56] References Cited

U.S. PATENT DOCUMENTS

| | | | |
|---|---|---|---|
| 4,307,311 | 12/1981 | Grozinger | 242/1.1 R |
| 4,426,771 | 1/1984 | Wang et al. | 310/184 X |
| 4,541,575 | 9/1985 | Dickerson | 242/7.03 |
| 4,807,821 | 2/1989 | Kim | 242/7.03 |
| 4,946,111 | 8/1990 | Luciani et al. | 242/1.1 R |

FOREIGN PATENT DOCUMENTS

0168055 1/1986 European Pat. Off. ............ 29/596
62-203535 8/1987 Japan .

Primary Examiner—Andrew M. Falik
Attorney, Agent, or Firm—Burns, Doane, Swecker & Mathis

[57] ABSTRACT

A method of winding an armature of an electric rotating machine, wherein vectors representing amounts of unbalance measured at the respective winding portions are composed to obtain a basic resultant vector which in turn is split into two components directed along two adjacent winding portions. The two components are then used to calculate amount of unbalance based on which the number of turns of two armature windings to be wound around the two adjacent winding portions is corrected and the number of turns of armature windings to be wound around the respective winding portions is determined. Finally, the armature windings are formed around the respective winding portions based on the determined number of turns.

16 Claims, 5 Drawing Sheets

DISTANCE BETWEEN THE CENTER OF WINDING AND AN AXIS OF ROTATION OF ARMATURE

X AXIS: SLOT NUMBER

Fig.4

WEIGHT OF WINDING

X AXIS: SLOT NUMBER

Fig.5

AMOUNT OF UNBALANCE

X AXIS: SLOT NUMBER

METHOD OF WINDING ARMATURE OF ELECTRIC ROTATING MACHINE

BACKGROUND OF THE INVENTION

1. Field of the Invention:

The present invention relates generally to a method of wiring an armature of an electric rotating machine such as a rotor of an electric motor or a rotor of an alternator. More particularly, it relates to such a winding method which is able to reduce an initial unbalance involved in the production of an armature of the electric rotating machine having a plurality of armature windings.

2. Description of the Prior Art:

An armature of a high-speed electric rotating machine such as a rotor of an electric motor or a rotor of an alternator must be balanced about its axis of rotation; if not so, the armature while it is rotating would produce excessive vibration which will cause various serious problems.

In the manufacture of the armature, however, the amount of unbalance involved in the armature generally increases as the assembling of the armature proceeds. This is because amounts of unbalance associated with individual components are accumulated and sometimes enhanced by the assembling method employed. In the case of the rotor for motors or the rotor for alternators, the amount of unbalance involved in the entire windings is considerably large and may exceed 50% of the amount of unbalance of the entire rotor.

In the manufacture of these rotors, a dynamic balancing is used to reduce or cancel out the unbalance created in the course of the manufacture of each rotor. In the case of the rotor for motors, the dynamic balancing is performed by using either a "minus" balancing method in which the outer periphery of an unbalanced rotor is cut on its heavy side, or a "plus" balancing method in which a balancing material such as a so-called patty is attached to a lighter side of the rotor. One example of the plus balancing method is disclosed in Japanese Patent Laid-open Publication No. 62-203535 in which a patty is automatically attached to the light side of a point of unbalance involved in the winding of a rotor.

Correction of unbalancing of an armature of an electric rotating machine needs an additional balancing process using a balancing machine. In case where the patty is used in such balancing process, a tedious and time-consuming adjustment of the amount of patty used is needed. Eventually, the unbalance correction increases the production cost of the armature.

Many armature windings are formed by the lap winding in which the windings are wound around winding portions each composed of one slot formed in the armature. According to the lap winding, the amount of unbalance involved in a first-formed winding wound around a first slot greatly differs from the amount of unbalance involved in a subsequently formed winding wound around a second or succeeding slot. The amount of unbalance is indicated by the product of the mass of a winding and the eccentricity of this winding with respect to the axis of rotation. The difference in the amount of unbalance is created for the reasons described below. The first-formed winding at the first slot is closely fitted with the body of a rotor, while a second-formed winding at the second slot overlaps the first-formed winding. Thus, the length and mass of the second-formed winding are larger than those of the first-formed winding. Since the unbalancing is the product of the mass of the winding and the eccentricity of the winding with respect to the axis of rotation as stated above, a difference in the amount of unbalance is created between the winding formed around the first slot and the winding formed around the subsequent slot. In most cases, the amounts of unbalance created at the second and succeeding slots varies regularly relative to the amount of unbalance created at the first slot. Since the winding formed around the first slot has a smaller amount of unbalance than the windings formed around the second and succeeding slots, the light side of an unbalancing of the entire armature windings is located in the vicinity of the first slot and appears in a substantially constant amount.

SUMMARY OF THE INVENTION

The present inventors have made this invention through the researches carried out on the basis of the finding that as viewed from the entire windings, the light side of an unbalancing is located in the vicinity of the first slot other than the second and succeeding slots and appears in a substantially constant amount.

An object of this invention is to provide a method of winding an armature of an electric rotating machine which is capable of forming a plurality of windings on an armature core with a minimum amount of unbalancing involved, thereby obviating the need for a balancing process after the armature windings are completed.

Another object of this invention is to provide a winding method which is able to produce a revolving armature stably at a high quality.

According to a preferred embodiment of this invention, vectors representing amounts of unbalance measured at a plurality of winding portions of an armature of an electric rotating machine are composed so as to obtain a basic resultant vector. The basic resultant vector is split into two components directed along two adjacent winding portions, and amounts of unbalance are calculated based on vector quantities of the two components. Then, based on the results of this calculation, the number of turns of two armature windings to be wound around the above-mentioned two adjacent winding portions is corrected so as to determine the number of turns of a plurality of armature windings to be wound around the respective winding portions. Finally, the armature windings are formed around the respective winding portions based on the determined number of turns. The foregoing correction is preferably performed by either increasing or reducing the number of turns of each of the two armature windings.

According to another preferred embodiment of this invention, vectors representing amounts of unbalance measured at a plurality of winding portions of an armature of an electric rotating machine are composed so as to obtain a first basic resultant vector. Form the first basic resultant vector, a second basic resulting vector is set, having a same magnitude as the first basic resultant vector and directed diametrically opposite to the first basic resultant vector. The second basic resultant vector is split into two components directed along two adjacent winding portions which are not adjacent to the first basic resultant vector, and based on vector quantities of the two components, amounts of unbalancing are calculated. Then, based on the results of this calculation, the number of turns of two armature windings to be wound around the two adjacent winding portions are corrected. This correction is preferably performed by increasing or alternately by reducing the number of turns of the two armature windings.

Thus, the windings at the respective winding portions have a substantially the same weight. The amount of unbalance involved in each winding portion of the armature is measured and used to set the number of turns of a winding to be wound around the corresponding winding portion, so that the amount of unbalance at the winding portion is minimized.

The basic resultant vector may be a vector directed to a heavy side of an unbalance involved in the armature, or alternately a vector directed to a light side of an unbalance involved in the armature. Preferably, the calculating is performed previously by using a number of armatures and based on measured data on the distance between the center of an armature winding wound around each winding portion of each respective armature and an axis of rotation of the armature, and the weight of each armature winding.

Correction of unbalance is possible solely by the winding process. This obviate the need for an additional balancing made after the winding is performed. The unbalance correction is carried out by changing the number of turns of the armature windings, so that the amount of correction can easily be adjusted by controlling the amount of a copper wire used for the formation of the corresponding armature windings.

The above and other objects, features and advantages of the present invention will become more apparent from the following description when making reference to the detailed description and the accompanying sheets of drawings in which preferred structural embodiments incorporating the principles of the present invention are shown by way of illustrative examples.

DETAILED DESCRIPTION OF THE INVENTION

FIGS. 1 through 8 show a first embodiment according to one aspect of this invention. In this embodiment, an armature of an electric rotating machine comprises a rotor R of an electric motor.

Figure 1:
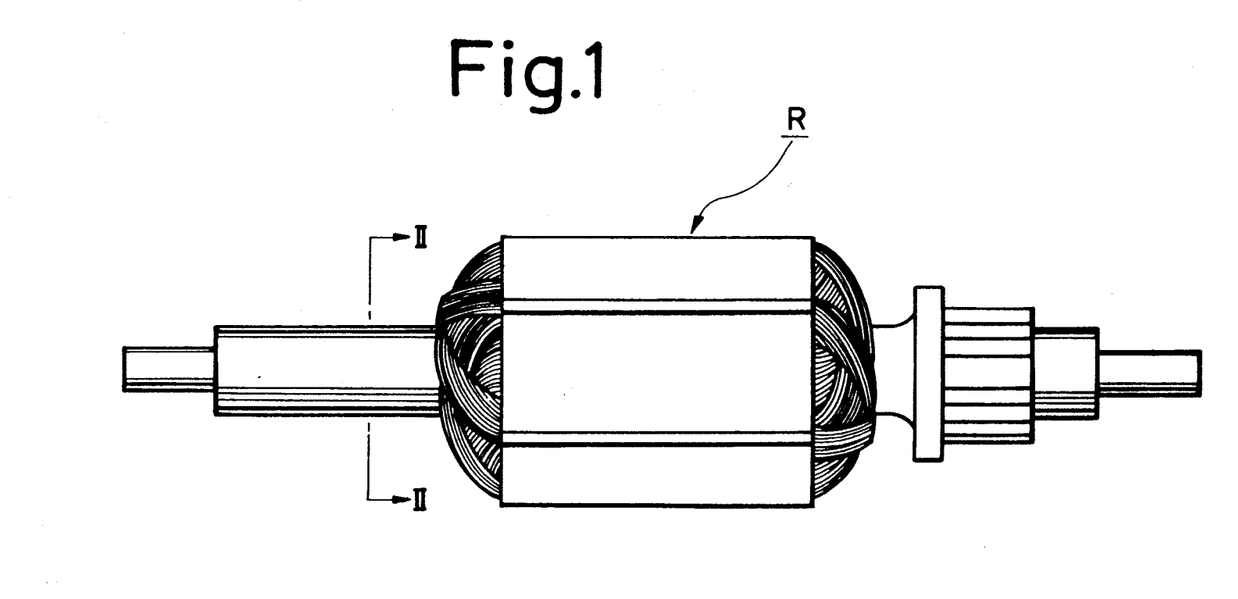
FIG. 1 is a diagrammatical side view of a rotor for motors manufactured in accordance with a method of this invention.
Figure 2:
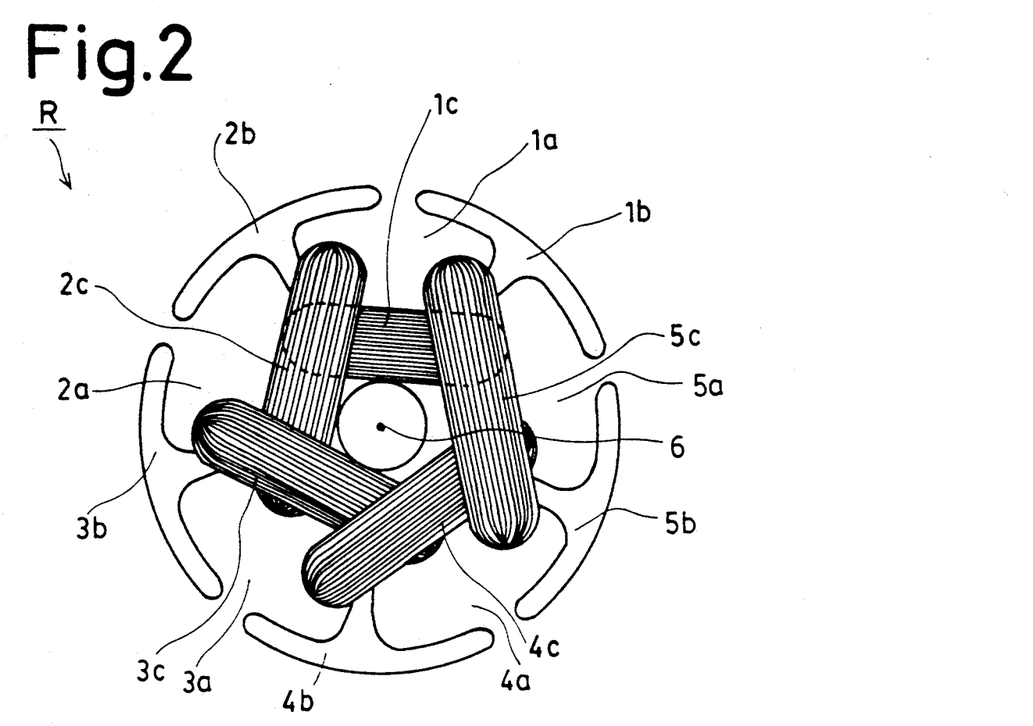
FIG. 2 is an enlarged end view in the direction of the arrows substantially along the line II—II of FIG. 1.

The rotor R, as shown in FIG. 2, includes a rotor core having five slots $1a$, $2a$, $3a$, $4a$ and $5a$ defined by and between five pole pieces $1b$, $2b$, $3b$, $4b$ and $5b$, and a rotating shaft 6 firmly fitted in a central hole of the rotor core. Each of the slots $1a$–$5a$ constitutes one winding portion of the rotor R. When armature windings $1c$, $2c$, $3c$, $4c$ and $5c$ formed of copper wires are placed in the slots $1a$, $2a$, $3a$, $4a$ and $5a$, a first winding $1c$ is wound around the first pole piece $1b$ and the second pole piece $2b$ so as to surround the first slot $1a$. Then a second winding $2c$ is wound around the second pole piece $2b$ and the third pole piece $3b$ so as to surround the second slot $2a$. In this instance, since the second pole piece $2b$ is wound by the first winding $1c$ extending around the first slot $1a$, the second winding $2c$ overlaps the first winding $1c$. Likewise, when the third slot $3a$ is surrounded by the third winding $3c$, the third winding $3c$ overlaps the second winding $2c$ extending in the third slot $3a$. When the fourth slot $4a$ is surrounded by the fourth winding $4c$, the fourth winding $4c$ overlaps the third winding $3c$ extending in the fourth slot $4a$. Finally, a fifth winding $5c$ is wound around the fifth pole piece $5b$ and the first pole piece $1b$ so as to surround the fifth slot $5a$. In this instance, the fifth winding $5c$ overlaps the first and fourth windings $1c$ and $4c$ extending in the fifth slot $5a$.

According to the foregoing winding system, both the distance between a longitudinal axis of the rotating shaft 6 and the center of each of the first to fifth windings $1c$–$5c$, and the weight of the respective windings $1c$–$5c$ are not constant, so that the resultant rotor R involves an amount of unbalance.

Using a number of sample rotors R (100 in number, for example), data on the amount of unbalance are collected based on the distance between the longitudinal axis of the rotating shaft 6 and the center of each respective coil $1c5c$, and the weight of the respective windings $1c$–$5c$. The data thus collected are used to determine the number of turns of each of the windings $1c$–$5c$ which may vary within an allowable range of electric specification. To determine the number of turns of each respective winding $1c$–$5c$, the amount of correction is calculated in terms of the number of turns of the winding.

The number of turns (X) to be corrected for each winding is calculated by the following equation (1).

$$X = V \cdot T / D \cdot W \tag{1}$$

where V is a vector quantity of one of two components split from a basic resultant vector, T is the number of turns of one of two armature windings wound around a corresponding one of two winding portions along which the one component is directed, D is the distance between the center of the one armature winding and an axis of rotation of the armature, and W is the weight of the one armature winding.

Then, the number of turns to be corrected X is used to calculate a desired number of turns of a winding to be formed to surround each slot in accordance with the following equation (2).

$$Tt - Td = X \tag{2}$$

where Tt is the total number of turns of the windings, and Td is the desired number of turns of a winding to be formed at the corresponding slot.

The number of turns of each winding thus determined is inputted to a control unit for controlling the operation of a winding machine so that each of the windings 1c–5c is formed around a corresponding one of the slots 1a–5a on the basis of the determined number of turns. The vector quantity produced by unbalance of the rotor may be a negative value or a positive value.

Using 100 rotors for a compact motor having five slots each wound by a winding of 60 turns, actual data were collected by measurement on the distance between the center of each winding and an axis of rotation of the rotor, the weight of the respective windings, and the amount of unbalance produced at each slot.

Figure 3:
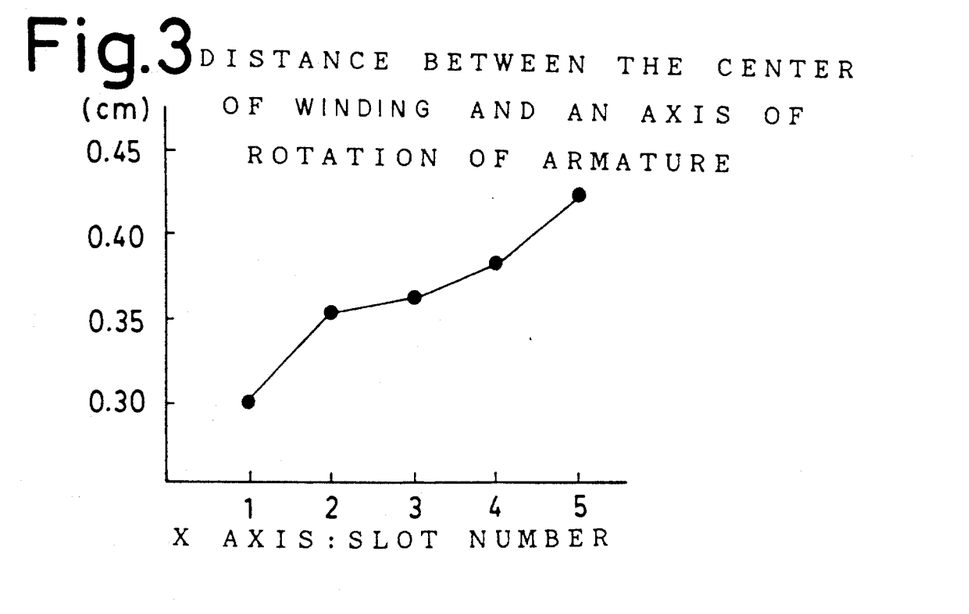
FIG. 3 is a graph showing the distance between an axis of rotation and individual windings.
Figure 4:
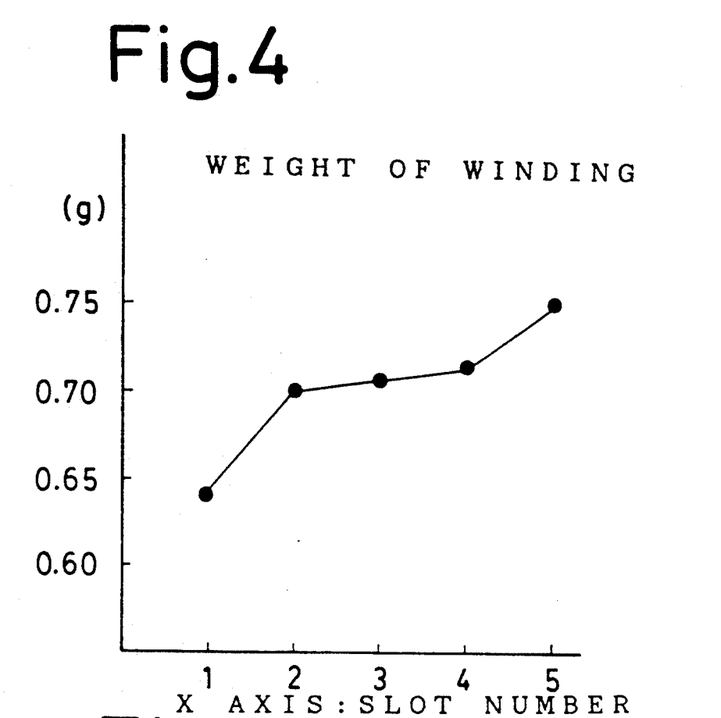
FIG. 4 is a graph showing the weight of windings.
Figure 5:
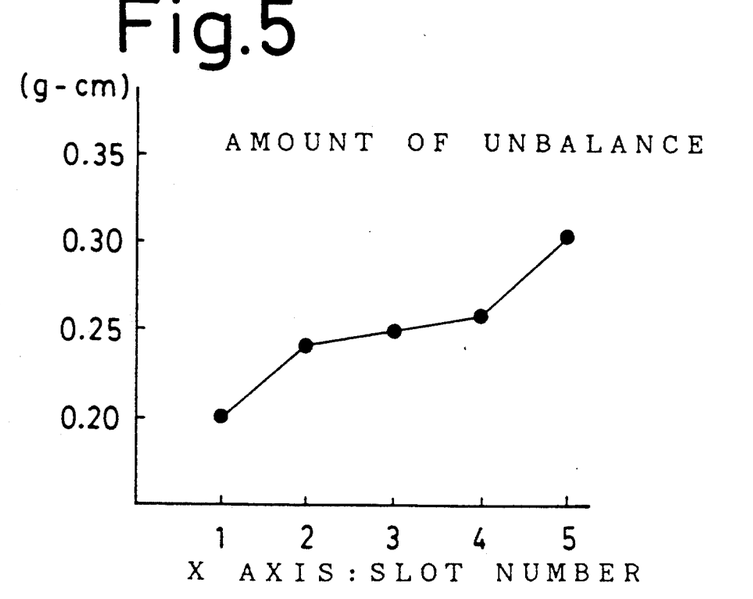
FIG. 5 is a graph showing the amount of unbalance incurred in each winding.

FIG. 3 shows the average of 100 measurements on the distance between the center of each of five windings and the axis of rotation of the rotor. FIG. 4 shows the average of 100 measurements on the weight of each winding at a corresponding one of the five slots. FIG. 5 shows the average of 100 measurements on the amount of unbalance produced at each slot.

Figure 6:
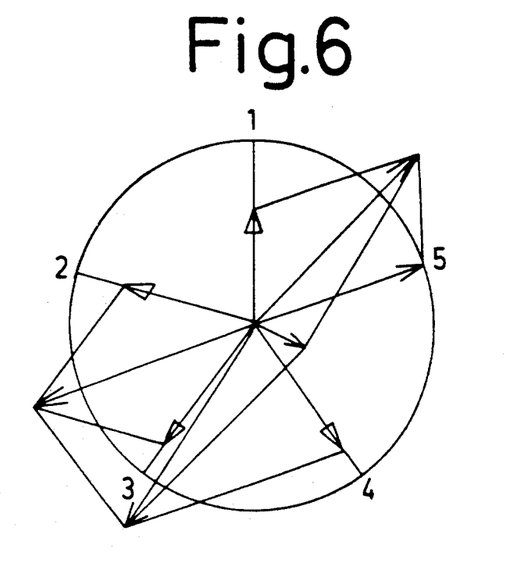
FIG. 6 is a diagrammatical view explanatory of the manner in which composition of unbalance vectors of the respective windings is performed.
Figure 7:
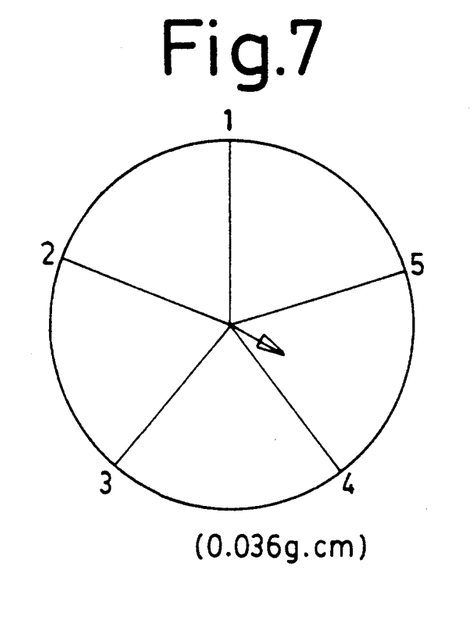
FIG. 7 is a diagrammatical view illustrative of the resultant vector obtained by the composition shown in FIG. 6.
Figure 8:
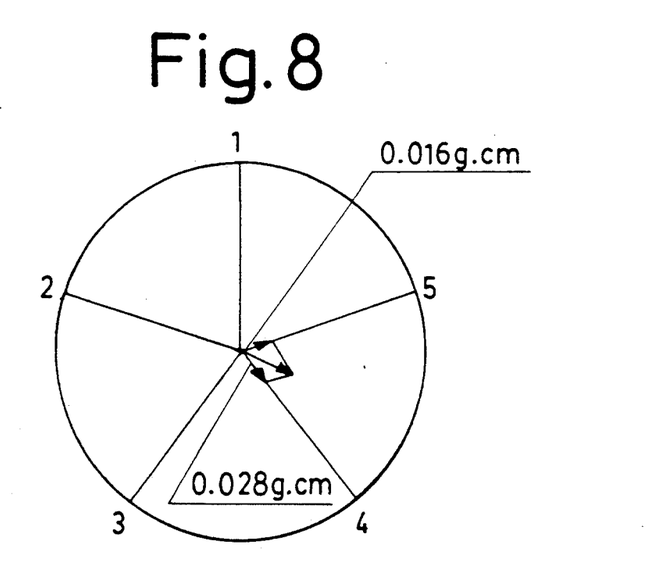
FIG. 8 is a diagrammatical view showing the resultant vector split into two components directed along two adjacent winding portions.

As shown in FIGS. 3 through 5, the distance between the axis of rotation of the rotor and the center of each respective winding, and the weight of the windings gradually increase as the slot number becomes large, that is, in the direction from the first slot toward the fifth slot with the result that the amount of unbalance gradually increases as the slot number increases, that is in the direction from the first slot toward the fifth slot. The amount of unbalance created at the respective slots are indicated by vector quantities as shown in FIG. 6, which vector quantities are composed to obtain a basic resultant vector. In the illustrated embodiment, the basic resultant vector is 0.036 g.cm, as shown in FIG. 7. The basic resultant vector is split into two components extending along two adjacent slots, namely the fourth slot and the fifth slot, as shown in FIG. 8.

One of these two components which is directed along the forth slot has a magnitude of 0.028 g.cm, while the other component along the fifth slot has a magnitude of 0.016 g.cm. If an amount of correction (the number of turns of a copper wire) necessary for the fourth slot is X, then X can be indicated by the following equation by using the equation (1) above $$0.028 \text{ g.cm} = 0.38 \text{ cm} \times 0.71 \text{ g} / 60 \text{ turns} \times X. \quad (3)$$

Hence, $X = 6.22$ ($= 6$). This means that 0.071 g should be reduced.

Similarly, if an amount of correction necessary for the fifth slot is X, then $$0.016 \text{ g.cm} = 0.42 \text{ cm} \times 0.74 \text{ g} / 60 \text{ turns} \times X. \quad (4)$$

Hence, $X = 3.09$ ($= 3$). This means that 0.037 g should be reduced.

In the foregoing equations (3) and (4), each of the values 0.38 and 0.42 is the distance between the axis of rotation of the rotor and the center of the winding, and each of the values 0.71 and 0.74 is the weight of the winding.

The calculated integers of approximately 6 and approximately 3 indicate the amount of correction for the fourth and fifth slots, respectively, which should be reduced from the predetermined number of turns (60 turns in the illustrated embodiment) of the corresponding windings. Thus, for the fourth slot, 6 turns are reduced from 60 turns and the resultant 54 turns represent the number of turns of a winding wound around the fourth slot. Similarly, for the fifth slot, 3 turns are reduced from 60 turns and the resultant 57 turns represent the number of turns of a winding wound around the fifth slot.

With the windings thus corrected in accordance with this invention, the average amount of unbalance involved in the 100 rotors was 10 mg.cm, and the difference between minimum and maximum values to indicate the amount of scatter or dispersion $\sigma$ was 7 mg.cm. As against the rotors of this invention, the rotors having conventional windings have the average amount of unbalance (indicated by torque) of 40 mg.cm and the scatter or dispersion $\sigma$ of 13 mg.cm. This means that the rotors having the windings of this invention possess one-fourth the average amount of unbalance and about one-half the scatter or dispersion, as compared to the rotors having the conventional windings.

Despite the changes in the number of turns of the windings, the rotors related to this invention showed initial performance characteristics comparable to those of the conventional rotors and withstood an endurance test without causing any deficiencies, such as fluctuation in rotation speed.

In the first embodiment described above, the basic resultant vector is split into two components directed along two adjacent slots; the two vector components are used to calculate an amount of correction for each of two slots; and in accordance with the amount of correction, the number of turns of a winding wound around the corresponding slot is adjusted (reduced in the illustrated embodiment).

Figure 9:
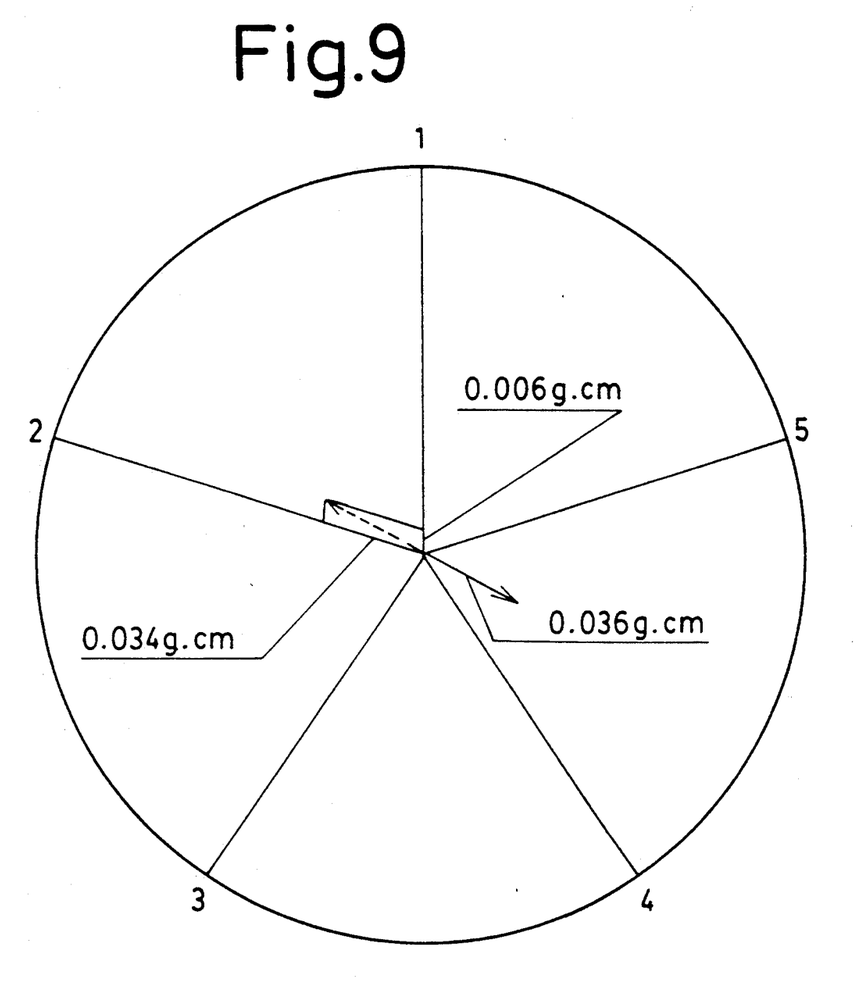
FIG. 9 is a diagrammatical view explanatory of the manner in which the resultant vector is split into two components directed along two winding portions other than two adjacent winding portions according to another embodiment of this invention.

FIG. 9 shows a second embodiment of this invention. According to this embodiment, the number of turns of the winding is adjusted by increasing the number of turns of a winding wound around a slot which is not adjacent to the base resultant vector.

Vectors representing the amount of the unbalances created at the respective slots are composed to obtain a first basic resultant vector. From the first basic resultant vector, a second basic resultant vector is obtained, which is the same in magnitude as the first basic resultant vector and is opposite in direction to the first basic resultant vector. The second basic resultant vector is used to adjust the number of turns of each of two adjacent windings wound around the respective slots which are not adjacent to the first basic resultant vector.

As shown in FIG. 9, the second resultant vector indicated by a broken line is split into two components along two adjacent slots. The number of turns of each of two windings which are wound around the two adjacent slots is adjusted (increased in the illustrated embodiment). More specifically, the broken lined second resultant vector having a magnitude of 0.036 g.cm and directed opposite to the first resultant vector is split into two components along the first and second slots, respectively. One of the components directed along the first slot has a magnitude of 0.006 g.cm and the other component directed along the second slot has a magnitude of 0.034 g.cm. Using the equation (1) above, an amount of correction (X) for the first slot is obtained by $$0.006 \text{ g.cm} = 0.31 \text{ cm} \times 0.64 \text{ g} / 60 \text{ turns} \times X. \quad (5)$$

Hence, $X = 1.81$ ($\approx 2$). This means that 0.021333 g should be increased.

Similarly, for the second slot, the amount of correction (X) is obtained by $$0.034 \text{ g.cm} = 0.36 \text{ cm} \times 0.69 \text{ g} / 60 \text{ turns} \times X. \quad (6)$$

Hence, $X = 8.21$ ($\approx 8$). This means that 0.092 g should be increased.

As a consequence of this calculation, the number of turns of a winding wound around the first slot is increased by two turns up to 62 turns, while the number of turns of a winding wound around the second slot is increased by 8 turns up to 68 turns.

The rotors having windings balanced in accordance with the embodiment shown in FIG. 9 demonstrated the same performance characteristics as the rotors with the windings according to the first embodiment shown in FIGS. 6–8.

In the embodiments described above, the basic resultant vector is directed to a heavy side of the point of unbalance. However, it is possible to use a basic resultant vector directed to a light side of the point of unbalance. The split components of the basic resultant vector may further be split for the purpose of adjustment of the number of turns of the armature windings.

Obviously, various minor changes and modifications of the present invention are possible in the light of the above teaching. It is therefore to be understood that within the scope of the appended claims the invention may be practiced otherwise than as specifically described.

What is claimed is:

1. A method of forming armature windings wound around a plurality of winding portions of an armature of an electric rotating machine, comprising the steps of:
   composing vectors representing amounts of unbalance measured at the respective winding portions, thereby obtaining a basic resultant vector;
   splitting said basic resultant vector into two components directed along two adjacent winding portions and calculating amounts of unbalance based on vector quantities of said two components;
   based on the results of said calculation, correcting the number of turns of two armature windings to be wound around said two adjacent winding portions so as to determine the number of turns of a plurality of armature windings to be wound around the respective winding portions; and
   forming said armature windings around the respective winding portions based on said determined number of turns.

2. A method according to claim 1, wherein said basic resultant vector is a vector directed to a heavy side of an unbalance involved in the armature.

3. A method according to claim 1, wherein said basic resultant vector is a vector directed to a light side of an unbalance involved in the armature.

4. A method according to claim 1, wherein said correcting is performed by increasing the number of turns of said two armature windings.

5. A method according to claim 1, wherein said correcting is performed by reducing the number of turns of said two armature windings.

6. A method according to claim 1, wherein said calculating is performed previously by using a number of armatures and based on measured data on the distance between the center of an armature winding wound around each winding portion of each respective armature and an axis of rotation of the armature, and the weight of each armature winding.

7. A method according to claim 4, said correcting is performed based on an amount of correction X obtained by $$X = V \cdot T / D \cdot W$$

where V is a vector quantity of one of said two components split from said basic resultant vector, T is the number of turns of one of said two armature windings wound around a corresponding one of said two winding portions along which said one component is directed, D is the distance between the center of said one armature winding and an axis of rotation of the armature, and W is the weight of said one armature winding.

8. A method according to claim 5, said correcting is performed based on an amount of correction X obtained by $$X = V \cdot T / D \cdot W$$

where V is a vector quantity of one of said two components split from said basic resultant vector, T is the number of turns of one of said two armature windings wound around a corresponding one of said two winding portions along which said one component is directed, D is the distance between the center of said one armature winding and an axis of rotation of the armature, and W is the weight of said one armature winding.

9. A method of winding armature windings around a plurality of winding portions of an armature of an electric rotating machine, comprising the steps of:
   composing vectors representing amounts of unbalance measured at the respective winding portions, thereby obtaining a first basic resultant vector;
   setting a second basic resulting vector having a same magnitude as said first basic resultant vector and directed diametrically opposite to said first basic resultant vector;
   splitting said second basic resultant vector into two components directed along two adjacent winding portions and calculating amounts of unbalance based on vector quantities of said two components, said two winding portions being other than those adjacent to said first basic resultant vector;
   based on the results of said calculation, correcting the number of turns of two armature windings to be wound around said two adjacent winding portions so as to determine the number of turns of a plurality of armature windings to be wound on the respective winding portions; and
   forming said armature windings around the respective winding portions based on said determined number of turns.

10. A method according to claim 9, wherein said basic resultant vector is a vector directed to a heavy side of an unbalance involved in the armature.

11. A method according to claim 9, wherein said basic resultant vector is a vector directed to a light side of an unbalance involved in the armature.

12. A method according to claim 9, wherein said correcting is performed by increasing the number of turns of said two armature windings.

13. A method according to claim 9, wherein said correcting is performed by reducing the number of turns of said two armature windings.

14. A method according to claim 9, wherein said calculating is performed previously by using a number of armatures and based on measured data on the distance between the center of an armature winding wound around each winding portion of each respective armature and an axis of rotation of the armature, and the weight of each armature winding.

15. A method according to claim 12, said correcting is performed based on an amount of correction X obtained by $$X = V \cdot T / D \cdot W$$

where V is a vector quantity of one of said two components split from said basic resultant vector, T is the number of turns of one of said two armature windings wound around a corresponding one of said two winding portions along which said one component is directed, D is the distance between the center of said one armature winding and an axis of rotation of the armature, and W is the weight of said one armature winding.

16. A method according to claim 13, said correcting is performed based on an amount of correction X obtained by $$X = V \cdot T / D \cdot W$$

where V is a vector quantity of one of said two components split from said basic resultant vector, T is the number of turns of one of said two armature windings wound around a corresponding one of said two winding portions along which said one component is directed, D is the distance between the center of said one armature winding and an axis of rotation of the armature, and W is the weight of said one armature winding.

* * * * *